(12) United States Patent
Ingles, Jr. et al.

(10) Patent No.: US 6,930,768 B2
(45) Date of Patent: Aug. 16, 2005

(54) DETECTION OF DISCONTINUITIES IN A MULTIMODE OPTICAL FIBER

(75) Inventors: Andrew L. Ingles, Jr., Alpharetta, GA (US); Alice Liu, Alpharetta, GA (US); William A. Reed, Summit, NJ (US); Peng Wang, Alpharetta, GA (US); Ming Yang, Atlanta, GA (US)

(73) Assignee: Furukawa Electric North America, Norcross, GA (US)

( * ) Notice: Subject to any disclaimer, the term of this patent is extended or adjusted under 35 U.S.C. 154(b) by 133 days.

(21) Appl. No.: 10/436,030

(22) Filed: May 12, 2003

(65) Prior Publication Data
US 2004/0227930 A1 Nov. 18, 2004

(51) Int. Cl.[7] .............................................. G01N 21/00
(52) U.S. Cl. ...................................................... 356/73.1
(58) Field of Search .......................... 356/73.1; 385/12, 385/13, 27, 32, 124, 127, 140, 145; 65/378, 407

(56) References Cited

U.S. PATENT DOCUMENTS

| | | |
|---|---|---|
| 4,286,979 A | 9/1981 | Buckler et al. |
| 4,319,902 A | 3/1982 | Hensel |
| 6,400,450 B1 | 6/2002 | Golowich et al. |
| 6,421,117 B1 | 7/2002 | Akikuni |
| 2002/0101577 A1 * | 8/2002 | Thwing et al. ............ 356/73.1 |

OTHER PUBLICATIONS abcTeletraining, Inc., Fiber Optic Cable—A Lightguide (1991), pp. 156–163.
A.H. Cherin, An Introduction to Optical Fibers, Bell Laboratories (1983), pp. 199–201.
Agilent Technologies GmbH, Optical Time Domain Reflectometers—Pocket Guide (2001), pp. 13–21.
Optronics, Tutorials—OTDRs (2003), www.optronics.gr.
Oman Fiber Optic Co., Technical Application Note—A Guide to OTDR Trace Analysis (Nov. 2001), www.omanfiber.com.

* cited by examiner

*Primary Examiner*—Tu T. Nguyen
(74) *Attorney, Agent, or Firm*—Law Office of Leo Zucker

(57) ABSTRACT

A system and technique for determining discontinuities over a span of a multimode optical fiber (MMF). An optical time domain reflectometer (OTDR) has an operating port, and a first end face of a singlemode optical fiber (SMF) is coupled to the operating port. Light pulses produced by the OTDR emerge from a second end face of the SMF, and an alignment stage aligns the second end face with an end face of a multimode optical fiber (MMF) having a core of given radius. The light pulses from the second end face of the SMF are applied at selected radial positions on the MMF core to excite corresponding mode groups in the MMF. Backscatter light produced by each excited mode group is coupled to the OTDR through the SMF. Locations and values of events detected along the MMF are indicated on the OTDR for each selected radial position.

13 Claims, 4 Drawing Sheets

DETECTION OF DISCONTINUITIES IN A MULTIMODE OPTICAL FIBER

BACKGROUND OF THE INVENTION

1. Field of the Invention

This invention relates to a system and a technique for identifying discontinuities, manufacturing flaws or other faults along the length of an optical fiber of the kind used for information or data transmission. In particular, the invention concerns an arrangement for determining performance characteristics of multimode optical fibers (MMFs).

2. Discussion of the Known Art

Multimode optical fibers typically have cores whose index of refraction (RI) is either constant throughout the core, or whose RI gradually diminishes radially outward from the core axis to a value that approaches the RI of a surrounding cladding. The former are referred to as step-index MMFs while the latter are known as graded-index fibers. Also, the cores of typical MMFs have diameters substantially greater than those of cores in single mode fibers (SMFs), so that a source of light for a MMF need not have as great an intensity as would be required for operation with a SMF. Typical core/cladding diameter ratios are 100 $\mu$m/140 $\mu$m and 200 $\mu$m/240 $\mu$m, for step index MMFs; and 50 $\mu$m/125 $\mu$m and 62.5 $\mu$m/125 $\mu$m, for graded index MMFs. By contrast, a typical SMF has a core/cladding diameter ratio of, for example, only 9 $\mu$m/125 $\mu$m. See J. Hecht, Understanding Fiber Optics, pages 55–72, Prentice Hall (3d ed. 1999)("Hecht"), which is incorporated by reference.

U.S. Pat. No. 4,286,979 (Sep. 1, 1981) is directed to a method of producing MMFs having improved dispersion characteristics. Specifically, light pulses from a laser source are launched into a first end face of a MMF through a singlemode fiber, by positioning an output end face of the SMF at a radial position on the core of the MMF that corresponds to a certain mode subgroup supported by the MMF. Such positioning is carried out with commercially available micropositioners using, e.g., adjustable micromanipulator vacuum chucks wherein the output end face of the SMF and the first end face of the MMF are retained with an axial gap of, e.g., less than 10 $\mu$m between the end faces and with the fiber axes parallel to one another. A refractive index matching oil or fluid fills the gap, and the chucks are adjustably displaced relative to one another in a radial direction with a resolution on the order of about 0.1 $\mu$m.

Light pulses output from a distal, second end face of the MMF are detected by a photodiode and differences in the timing of peaks in the output light pulses for each mode group are measured to obtain a differential mode group delay fiber characteristic. If the measurement results are not satisfactory for a particular fiber application, the results may then be used to modify accordingly the process by which preforms are being made in the production of the MMF. See also, U.S. Pat. No. 6,400,450 (Jun. 4, 2002) which discloses a method of qualifying a multimode optical fiber for bandwidth performance using a test set-up similar to that disclosed in the '979 patent. Both of the '979 and the '450 U.S. Patents are incorporated by reference.

Because it is not always practicable to perform end-to-end testing of an optical fiber which in typical installations extends over a distance on the order of kilometers, optical time domain reflectometers (OTDRs) which need to be coupled only to one end of a fiber under test, are now popular as a means to evaluate fiber performance. Losses, faults, reflections and other discontinuities, all of which are commonly referred to as "events", can be indicated on a display stage of the OTDR.

Specifically, OTDRs detect light that is backscattered within an optical fiber in response to light pulses that are launched with preset durations and frequency from an operating port of the OTDR into the one end of the fiber under test. The time delay and relative amplitude of the detected backscattered light is displayed as a function of distance along the fiber. See, A. H. Cherin, "An Introduction to Optical Fibers", Bell Laboratories, at pages 199–201 (1983); J. J. Refi, "Fiber Optic Cable—A LightGuide", AT&T Bell Laboratories Specialized Series, abc TeleTraining, Inc., pages 156–63 (1991); Agilent Technologies (Germany) GmbH, Optical Time Domain Reflectometers—Pocket Guide (2001), at pages 13–21; Hecht, at pages 361–363; and Optronics EYT, Tutorials—OTDRs, at Internet (web) address <http://www.optronics.gr> (2003)("Optronics"); all of which are incorporated by reference.

While OTDRs are constructed and used mainly for testing performance of long haul SMFs, configurations have been disclosed wherein OTDRs are used to measure performance characteristics of multimode fibers that span only hundreds rather than thousands of meters. Such MMFs are frequently encountered in office buildings, campuses, and local area networks (LANs). See Optronics, supra, at pages 8–9. Further, U.S. Pat. No. 6,421,117 (Jul. 16, 2002) discloses apparatus for performing time domain reflectometry on a multi-mode optical fiber, wherein a light source in an OTDR includes a laser diode, and a lens that focuses light from the diode onto a core of a light source MMF at a position offset a certain distance in a normal direction from the central axis of the light source fiber. Backscatter light is produced more uniformly over the length of the fiber under test for detection by the OTDR to enable more accurate measurements to be performed, according to the patent.

As far as is known, OTDRs have not been applied to determine or to obtain a transmission profile of a multimode fiber at a given location over a span of the fiber. Typically, such a measurement involves cutting the fiber and/or removing a protective coating that surrounds the fiber cladding at the given location. A known refractive near field method of measuring the transmission profile requires that the fiber be broken at the given location in order to obtain the profile at that location. Moreover, an interference method of measuring the profile also requires the removal of a protective plastic coating on the fiber cladding.

Uniformity of the entire light transmission profile along a MMF is essential in applications involving transmission data rates at 10 Gbps or higher. Suppliers of MMF for such high bandwidth applications must ensure fiber uniformity to their customers. Moreover, the ability to locate and identify defects precisely in a multimode fiber can serve as a diagnostic tool in fiber production, as well as a means for evaluating the quality of splices at various known locations over the length of an installed fiber. A system and technique that can determine attenuation or loss within a multimode fiber as a function of distance as well as radial position in the fiber, mode groups, and any changes in attenuation caused by point discontinuities, would therefore be highly desirable.

SUMMARY OF THE INVENTION

According to the invention, a system for determining discontinuities or events over a span of a multimode optical fiber, includes an optical time domain reflectometer (OTDR)

having an operating port and a display stage. A singlemode optical fiber (SMF) has a first end face coupled to the operating port and a second end face opposite the first end face, so that (i) light pulses produced by the OTDR will propagate from the operating port into the first end face of the SMF and emerge from the second end face of the SMF, and (ii) backscatter light when incident on the second end face of the SMF propagates toward the first end face of the SMF and enters the operating port of the OTDR.

An alignment stage is constructed and arranged to couple and align the second end face of the SMF with a first end face of a multimode optical fiber (MMF) having a core of given radius, and to (i) launch the light pulses emerging from the second end face of the SMF into the first end face of the MMF at a number of selected radial positions on the core for exciting corresponding mode groups in the MMF, and (ii) couple backscatter light produced in the MMF in response to each excited mode group to the OTDR through the SMF. Accordingly, the display stage of the OTDR indicates locations and values of events detected along the MMF for each of the selected radial positions.

According to another aspect of the invention, a method of determining discontinuities or events over a span of a multimode optical fiber, includes providing an optical time domain reflectometer (OTDR) having an operating port and a display stage, and coupling a singlemode optical fiber (SMF) having a first end face to the operating port so that (i) light pulses produced by the OTDR propagate from the operating port into the first end face of the SMF and emerge from a second end face of the SMF opposite the first end face, and (ii) backscatter light incident on the second end face of the SMF propagates toward the first end face and enters the operating port of the OTDR.

The method also includes aligning the second end face of the SMF with a first end face of a multimode optical fiber (MMF) having a core of a given radius, launching the light pulses emerging from the second end face of the SMF into the first end face of the MMF at a number of selected radial positions on the core thus exciting corresponding mode groups in the MMF, and coupling backscatter light produced in the MMF in response to each excited mode group to the OTDR through the SMF. The locations and values of events detected along the MMF for each of the selected radial positions is then indicated on the display stage of the OTDR.

For a better understanding of the invention, reference is made to the following description taken in conjunction with the accompanying drawing and the appended claims.

DETAILED DESCRIPTION OF THE INVENTION

Figure 1:
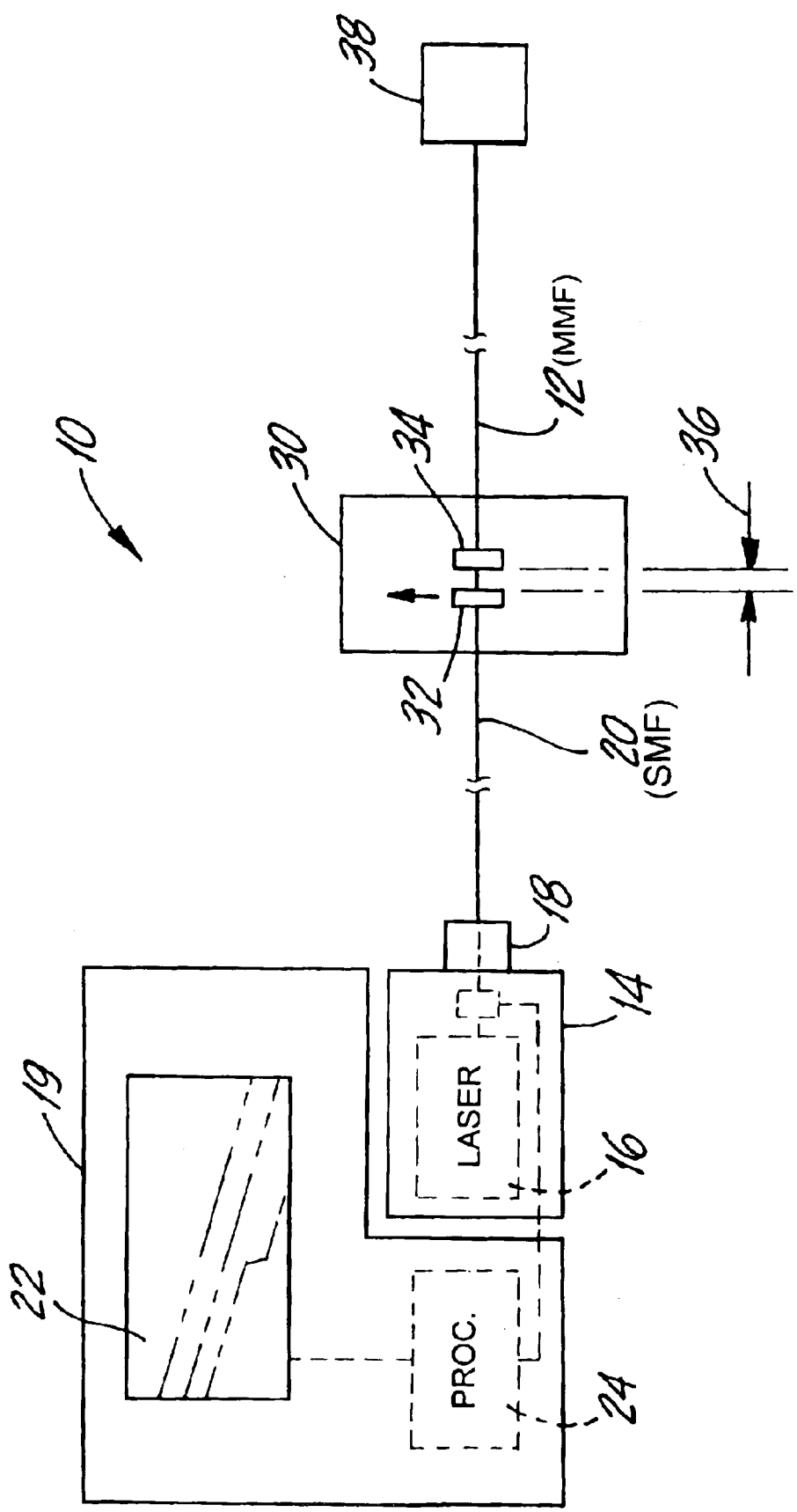
FIG. 1 is a schematic block diagram of a system for detecting discontinuities or events along a span of a multimode optical fiber, according to the invention.

FIG. 1 is a block diagram illustrating a system 10 for detecting discontinuities or events along a span of a multimode optical fiber (MMF) 12, according to the invention.

The system 10 includes a commercially available OTDR 14 having a light source, e.g., laser 16 which is constructed and arranged to produce light pulses of a determined duration, power and repetition rate. Light pulses output from the laser 16 are coupled to an operating port 18 of the OTDR. A singlemode optical fiber (SMF) 20 having a length of, e.g., about 2 kilometers, is connected at one end to the operating port 18.

The end of the fiber 20 remote from the operating port 18 is configured and arranged to (i) launch the pulses of light produced at the OTDR port 18 from laser 16 into a first end face of the MMF 12, and (ii) collect light that is backscattered by the MMF 12 in response to the launched light pulses. The OTDR 14 is controlled by a PC 19 having a display stage 22, and a signal processing stage 24 that is operative to detect the light backscattered by the MMF 12 and to drive the display stage 22.

Commercially available micropositioner apparatus 30, e.g., Newport model VP-25XA, includes a pair of vacuum chucks 32, 34. The second end face of the SMF 20 is seated in the chuck 32 and a first end face of the MMF 12 is seated in the chuck 34. The axes of the fibers are aligned substantially parallel to one another and a gap 36 of about 10 microns ($\mu$m) is defined between the confronting end faces of the two fibers 20, 12. See FIG. 2. A drop of an index matching oil available from, e.g., Cargille Laboratories with a RI of about 1.45 is provided so as to fill the gap 36 between the fiber end faces at all times. A second end face of the MMF 12 at the remote (distal) end of the fiber is preferably cleaved, and terminated at 38 by immersion in index matching fluid.

EXAMPLE 1

A "Photon Kinetics" model 6500 mainframe with a model 652SA10 laser plug-in was selected as the OTDR 14 in FIG. 1. An 8000 meter span of multimode optical fiber having a 50 $\mu$m/125 $\mu$m core/cladding diameter configuration and commercially available from OFS under the mark LaserWave(tm), was chosen for the MMF 12. The laser 16 in the OTDR 14 was set to produce pulses of light at a wavelength of 1310 nanometers and of 5 microsecond duration.

Figure 2:
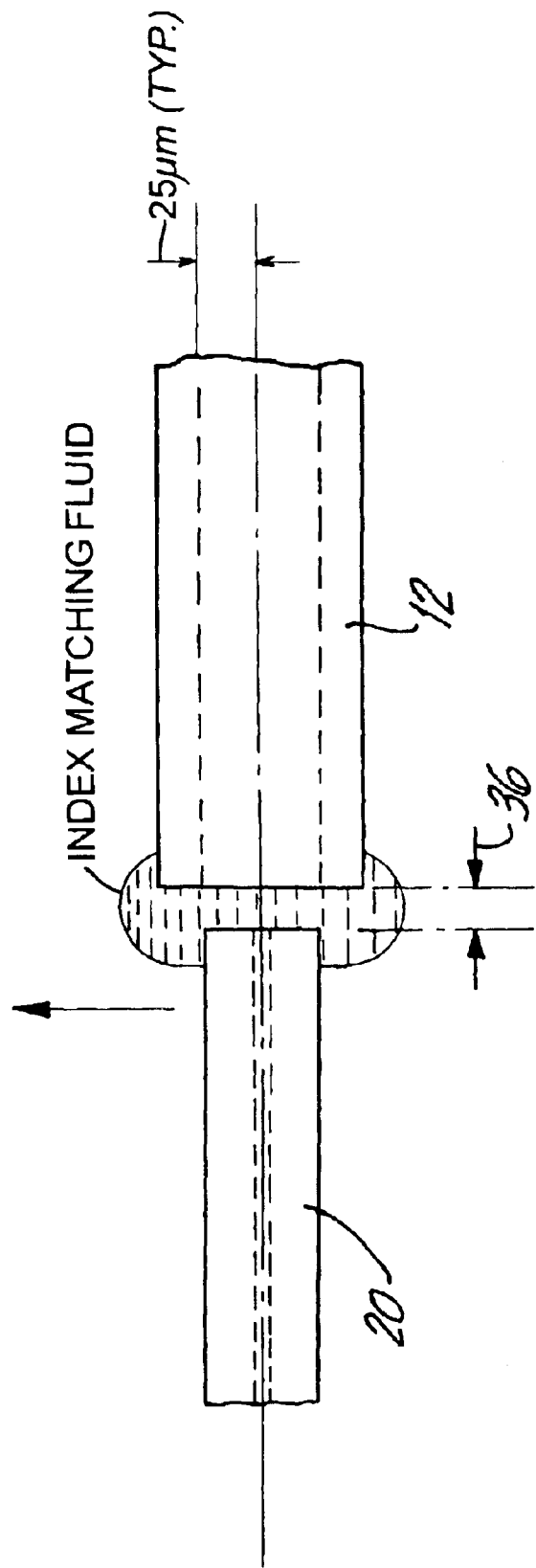
FIG. 2 is a detail view of a fiber micropositioner set up shown in FIG. 1.

As represented in FIG. 2, the chuck 32 of the micropositioner 30 apparatus was adjusted to scan the second end face of the SMF 20 in a radial direction over the first end face of the MMF 12 in increments of, e.g., 5 $\mu$m. An initial position of the chuck 32 was adjusted to align the SMF 20 with, e.g., to the center axis (i.e., 0 $\mu$m) of the MMF 12. The light pulses originating from the OTDR 14 were then launched from the SMF 20, through the index matching oil, and into the first end face of the MMF 12. Thus, only a relatively small subgroup of modes were excited in the MMF 12 and backscatter light produced by the MMF appeared on the OTDR display stage 22 as the uppermost trace in FIG. 3.

Figure 3:
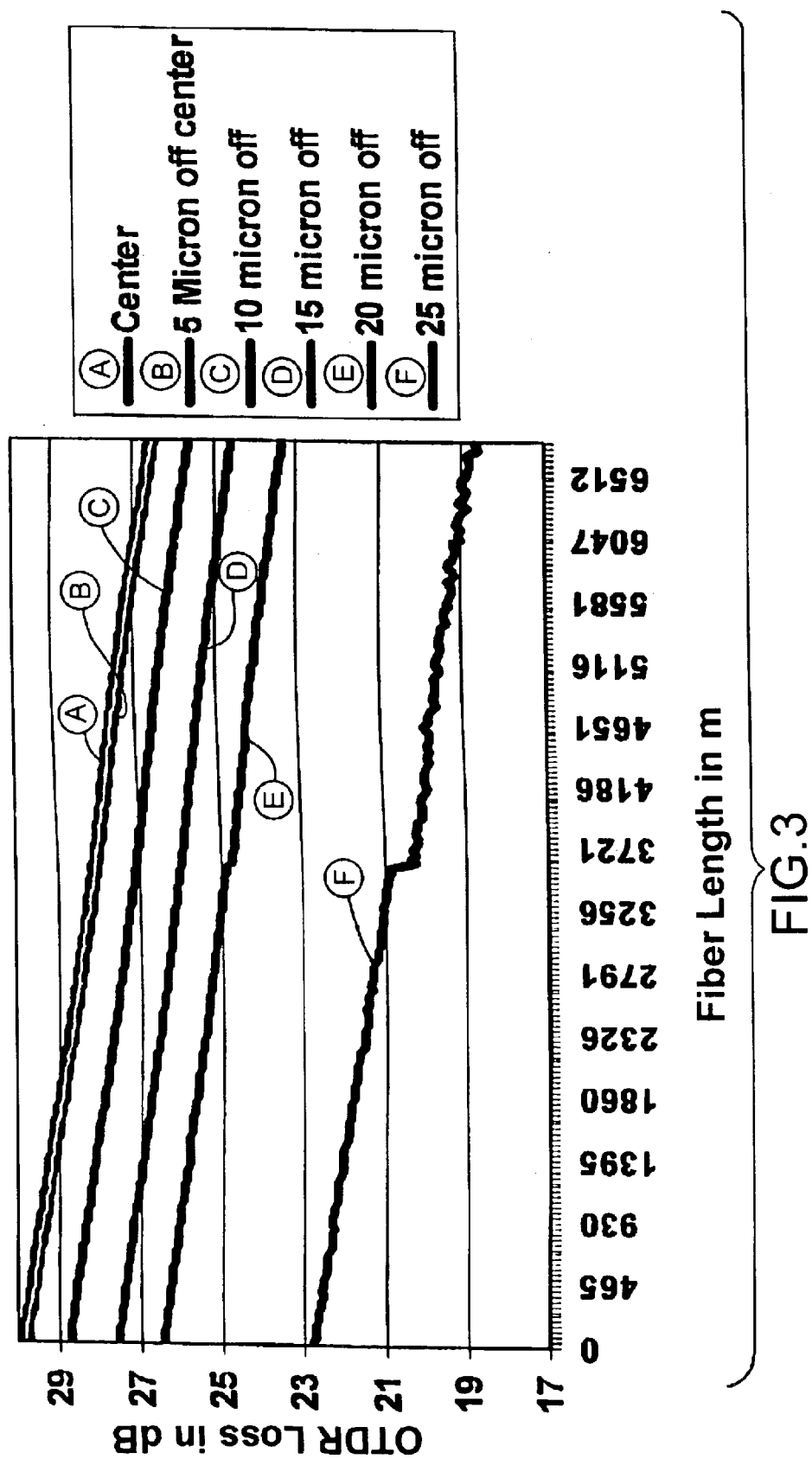
FIG. 3 is an OTDR display of events detected along a first span of a MMF, according to the invention.

The chuck 32 was then adjusted to displace the second end face of the SMF 20 by 5 $\mu$m radially outward from the center axis of the MMF 12. Accordingly, light pulses launched from the SMF 20 into the MMF 12 excited a subgroup of modes in the MMF 12 different from the mode subgroup excited when light pulses were launched into the center of the fiber's end face. A corresponding backscatter trace was obtained on the OTDR display stage 22, as seen in FIG. 3 just below the uppermost trace that was taken along the center axis of the fiber 12. Additional traces were obtained by the OTDR 14 as the chuck 32 was adjusted to launch light pulses into the core of the MMF 12 at positions 10 μm, 15 μm, 20 μm and 25 μm radially outward from the center axis of the fiber, thus selectively exciting all mode subgroups supported by the fiber 12.

As seen in FIG. 3, an event was first detected in the MMF 12 at about 3550 meters from the OTDR port 18, and at a radial position of 20 μm from the center of the fiber core. Note that the event was not detected at scanned radial positions less than 20 μm, and was found to be of even greater amplitude at a radial position of 25 μm, i.e., substantially at the periphery of the fiber core. This event was intentionally introduced prior to scanning by looping the fiber with a certain radius in the vicinity of the 3550 meter location. Looping of the fiber tends to introduce defects the magnitude of which increase with radially increasing position in the fiber core. Such defects are validated by the traces of FIG. 3.

FIG. 3 therefore represents a transmission profile of the MMF 12 that shows events over a range of both axial and radial positions along the length of the fiber. The event detected in the MMF 12 as shown in FIG. 3, would not have been identified using the known OTDR measurement techniques.

EXAMPLE 2

The "Photon Kinetics" mainframe and laser plug-in identified in Example 1 were selected again as the OTDR 14 in FIG. 1. A 500 meter length of LaserWave(tm) multimode optical fiber having a 50 μm/125 μm core/cladding diameter configuration was chosen for the MMF 12. The OTDR laser 16 was set to produce pulses of light at a wavelength of 1310 nanometers and of 200 nanosecond pulse width.

Figure 4:
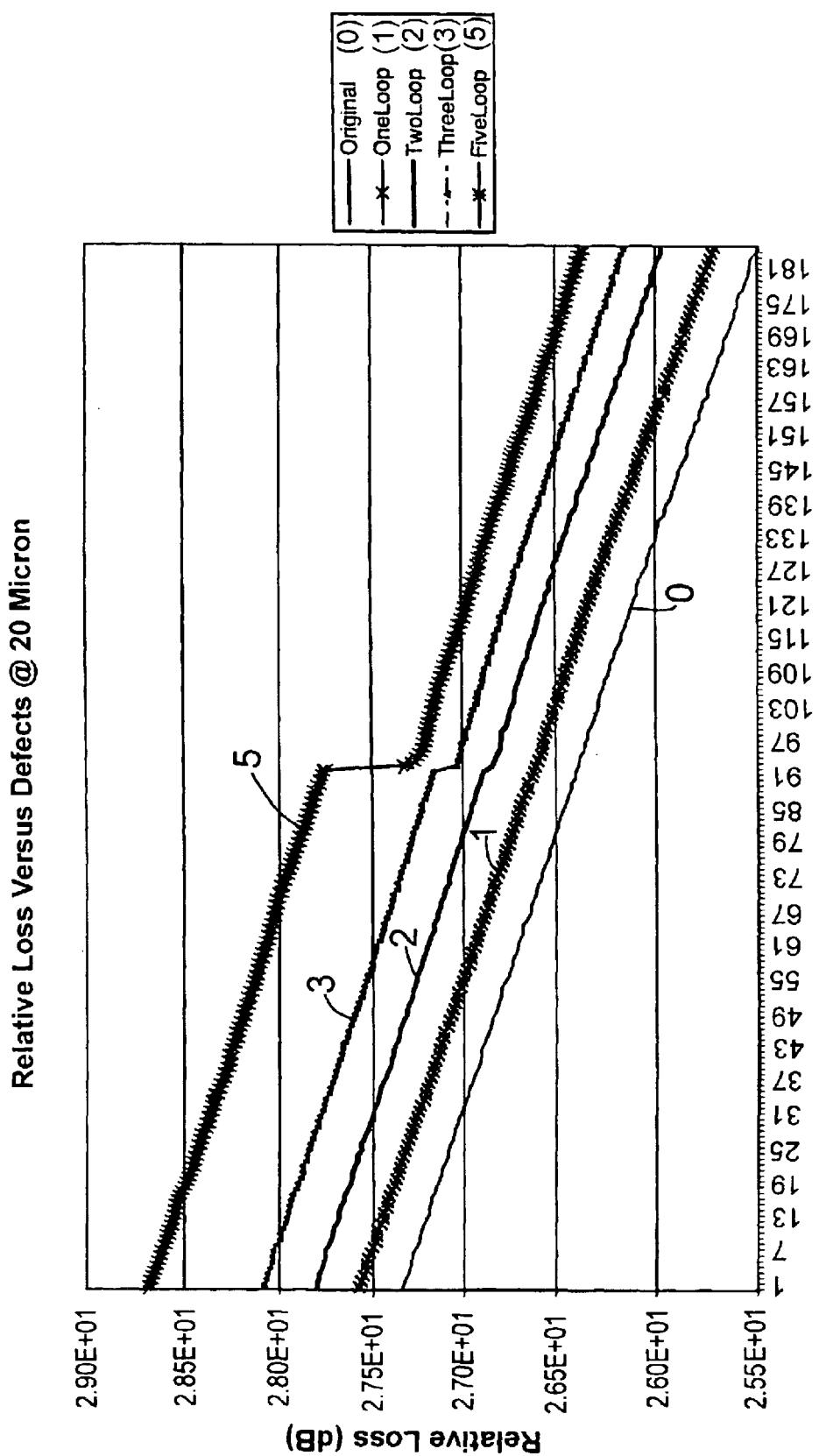
FIG. 4 is an OTDR display of events detected along a second span of a MMF, according to the invention.

The chuck 32 of the micropositioner apparatus 30 was adjusted to align the SMF 20 with the MMF 12, so as to launch light pulses into the core of the fiber 12 at a position 20 μm radially outward from the center axis of the fiber. An OTDR trace was then obtained and is represented in FIG. 4 as trace "0". Trace 0 shows that there were no events detected on the backscatter light produced in the fiber 12 in response to the light pulses thus launched into the fiber.

Defects of various size were then created in the fiber 12 by forming one or more loops in the fiber, each of about ¾-inch diameter at a certain position along the length of the fiber. Leaving the micropositioner chuck 32 at the 20 μm radial position, light pulses were launched in the core of the MMF 12 and traces were obtained by the OTDR 14 for the conditions of one loop (Trace "1"), two loops (Trace "2"), three loops (Trace "3") and five loops (Trace "5"). As seen in FIG. 4, the magnitude of the resulting event was greatest for the five loop condition (Trace 5).

As more loops would introduce a larger discontinuity, it may be concluded that nonuniformities in index profile or other physical fiber defects can be readily detected by the present technique. The severity of the nonuniformity or defect is determined by the drop in amplitude of the OTDR trace at the discontinuity.

The present system and technique enables a transmission profile to be obtained over a given span of a multimode optical fiber. The location along the fiber corresponding to any detected non-uniformities in the profile can be determined. Portions of the fiber containing such non-uniformities may then be removed and remaining sections of the fiber spliced to one another either directly or through a section of MMF known to be uniform, thus forming a length of multimode fiber that is substantially free of non-uniformities and which will meet expected performance characteristics.

While the foregoing represents a preferred embodiment of the invention, it will be understood by those skilled in the art that various modifications and changes may be made without departing from the spirit and scope of the invention, and that the invention includes all such modifications and changes as come within the scope of the following appended claims.

We claim:

1. A system for determining discontinuities or events over a span of a multimode optical fiber, comprising:

an optical time domain reflectometer (OTDR) having an operating port and a display stage;

a singlemode optical fiber (SMF) having a first end face coupled to the operating port of the OTDR, and a second end face opposite the first end face, wherein (i) light pulses produced by the OTDR propagate from said operating port into the first end face of the SMF and emerge from the second end face of the SMF, and (ii) backscatter light incident on the second end face of the SMF propagates toward the first end face of the SMF to enter the operating port; and an alignment stage constructed and arranged operatively to couple and align the second end face of the SMF with a first end face of a span of multimode optical fiber (MMF) having a fiber core with a known radius, wherein a second end face of the MMF at a remote end of said fiber has an index matching termination, and the alignment stage (i) launches the light pulses emerging from the second end face of the SMF into the first end face of the MMF at a number of selected radial positions on said fiber core for exciting corresponding mode groups in the MMF, and (ii) couples backscatter light produced in the MMF in response to each excited mode group to the operating port of the OTDR through the SMF;

the alignment stage is constructed and arranged to displace the SMF in a radial direction with respect to the axis of the MMF so that the light pulses emerging from the second end face of the SMF are launched into the first end face of the MMF at selected radial positions on the core of the MMF; and the display stage of the OTDR is operative to indicate locations and values of events detected along the MMF by the OTDR for each of the selected radial positions.

2. A system according to claim 1, wherein the alignment stage comprises a micropositioner having a pair of chucks.

3. A system according to claim 1, wherein the alignment stage is constructed and arranged to align the axes of the SMF and the MMF substantially parallel to one another.

4. A system according to claim 1, wherein a first radial position corresponds substantially to the center axis of the core of the MMF, and a second radial position corresponds substantially to the periphery of the core of the MMF.

5. A system according to 1, wherein the alignment stage is constructed and arranged to maintain a constant gap between the confronting and faces of the SMF and the MMF.

6. A system according to claim 5, wherein the gap is approximately 10 μm.

7. A system according to claim 5, including a refractive index (RI) matching fluid disposed to fill the gap between the end faces of the SMF and the MMF.

8. A system according to claim 7, wherein the matching fluid has a RI approximately equal to 1.45.

9. A method of determining events or discontinuities over a span of a multimode optical fiber, comprising:

providing an optical time domain reflectometer (OTDR) having an operating port and a display stage;

coupling a first end face of a singlemode optical fiber (SMF) to the operating port so that (i) light pulses produced by the OTDR propagate from the operating port into the first end face of the SMF and emerge from a second end face of the SMF opposite the first end face, and (ii) backscatter light incident on the second end face of the SMF propagates toward the first end face and enters the operating port of the OTDR;

aligning the second end face of the SMF with a first end face of a span of a multimode optical fiber (MMF) having a fiber core of a given radius, and terminating a remote end of the span of the MMF with an index matching termination;

launching the light pulses emerging from the second end face of the SMF into the first end face of the MMF at a number of selected radial positions on the core of the MMF, thus exciting corresponding mode groups in the MMF;

coupling backscatter light produced in the MMF in response to each excited mode group to the operating port of the OTDR through the SMF; and displaying locations and values of events detected along the MMF on the display stage of the OTDR for each of the selected radial positions.

10. The method of claim 9, including carrying out the aligning step so that light pulses emerging from the second end face of the SMF are launched into the first end face of the MMF at (i) a first radial position corresponding substantially to the center axis of the core of the MMF, and a (ii) a second radial position corresponding substantially to the periphery of the core of the MMF.

11. The method of claim 9, including maintaining a constant gap between the second end face of the SMF and the first end face of the MMF.

12. The method of claim 11, including disposing a refractive index (RI) matching fluid to fill said gap.

13. The method of claim 9, including removing one or more portions of the MMF at locations corresponding to detected events along the length of the fiber and splicing remaining sections of the fiber to one another, thus forming a length of multimode fiber that is free of non-uniformities to a degree sufficient to meet expected performance characteristics.

* * * * *